United States Patent
Suh

(10) Patent No.: US 9,533,558 B2
(45) Date of Patent: Jan. 3, 2017

(54) AUTOMATIC VEHICLE COVER

(71) Applicant: Ted Justin Suh, Los Angeles, CA (US)

(72) Inventor: Ted Justin Suh, Los Angeles, CA (US)

( * ) Notice: Subject to any disclaimer, the term of this patent is extended or adjusted under 35 U.S.C. 154(b) by 0 days.

(21) Appl. No.: 14/717,837

(22) Filed: May 20, 2015

(65) Prior Publication Data

US 2016/0339773 A1    Nov. 24, 2016

(51) Int. Cl.
*B60J 11/04*    (2006.01)

(52) U.S. Cl.
CPC .................... *B60J 11/04* (2013.01)

(58) Field of Classification Search
CPC .......... B60J 11/00; B60J 11/02; B60J 11/025; B60J 11/04
USPC ..................... 296/136.01, 136.04, 136.07, 296/136.1–136.13; 150/166
See application file for complete search history.

(56) References Cited

U.S. PATENT DOCUMENTS

| | | | | |
|---|---|---|---|---|
| 4,432,581 A * | 2/1984 | Guma | ................ | B60J 11/02 135/88.07 |
| 4,951,993 A * | 8/1990 | Taboada | ................ | B60J 11/00 150/166 |
| 5,413,396 A * | 5/1995 | Poznansky | ................ | B60J 11/00 150/166 |
| 5,511,845 A * | 4/1996 | Hindson | ................ | B60J 11/00 160/370.21 |
| 5,628,542 A * | 5/1997 | Hindson | ................ | B60J 11/00 160/370.21 |
| 5,823,607 A * | 10/1998 | Hindson | ................ | B60J 11/02 160/370.21 |
| 5,902,003 A * | 5/1999 | Hindson | ................ | B60J 11/02 293/128 |
| 5,941,593 A * | 8/1999 | McCann | ................ | B60J 11/02 296/136.1 |
| 6,035,874 A * | 3/2000 | Po-Chang | ................ | B60J 11/00 135/131 |
| 6,092,857 A * | 7/2000 | Rivas | ................ | B60J 11/00 296/136.04 |
| 6,672,643 B1 * | 1/2004 | Brodskiy | ................ | B60J 11/02 296/136.01 |
| 7,311,112 B2 * | 12/2007 | Pacheco | ................ | B60J 11/02 135/88.05 |
| 7,354,096 B2 * | 4/2008 | Hacker | ................ | B60J 11/00 296/136.12 |
| 8,070,211 B2 * | 12/2011 | Suh | ................ | B60J 11/00 150/166 |
| 8,167,356 B1 * | 5/2012 | Morazan | ................ | B60J 11/00 296/136.01 |
| 2005/0016692 A1 * | 1/2005 | Glaser | ................ | B60J 11/00 160/22 |
| 2006/0162873 A1 * | 7/2006 | Dao | ................ | B60J 11/00 160/122 |

(Continued)

*Primary Examiner* — Gregory Blankenship
(74) *Attorney, Agent, or Firm* — James. M. Smedley LLC; James Michael Smedley, Esq.

(57) ABSTRACT

The present invention generally relates to automatically deployed and retracted car cover systems. Specifically an interconnected framework of arms and springs has a retraction wire wrapped around a spool with a motor attached. When the motor releases the retraction wire in a controlled manner, the springs cause the interconnected framework to extend over the top of a vehicle. A flexible shell is attached to the framework and covers the vehicle as the interconnected framework is extended. The cover is retracted by the motor winding the retraction wire back onto the spool pulling the interconnected framework back to a housing dock.

17 Claims, 8 Drawing Sheets

(56) References Cited

U.S. PATENT DOCUMENTS

| | | | |
|---|---|---|---|
| 2007/0186966 A1* | 8/2007 | Hacker | B60J 11/00 135/88.05 |
| 2009/0140541 A1* | 6/2009 | Suh | B60J 11/00 296/136.01 |
| 2011/0088855 A1* | 4/2011 | Boustani | B60J 11/02 160/370.22 |
| 2011/0095561 A1* | 4/2011 | Li | B60J 11/04 296/136.13 |
| 2012/0146358 A1* | 6/2012 | Sassi | B60J 11/02 296/136.12 |
| 2013/0038085 A1* | 2/2013 | Chan | B60J 11/04 296/136.12 |
| 2016/0009166 A1* | 1/2016 | Sassi | B60J 11/04 296/98 |

* cited by examiner

AUTOMATIC VEHICLE COVER

FIELD OF THE INVENTION

The present invention generally relates to automatically deployed and refracted car cover systems. Specifically an interconnected framework of arms and springs has a retraction wire wrapped around a spool with a motor attached. When the motor releases the retraction wire in a controlled manner, the springs cause the interconnected framework to extend over the top of a vehicle. A flexible shell is attached to the framework and covers the vehicle as the interconnected framework is extended. The cover is retracted by the motor winding the retraction wire back onto the spool pulling the interconnected framework back to a housing dock.

BACKGROUND OF THE INVENTION

Vehicle covers are commonly used to protect vehicles from the elements when they are parked outdoors for extended periods of time. These covers are typically used to protect vehicles during long-term storage. However, with regard to damage to the vehicle's finish, there is very little difference between driving a vehicle daily in harsh conditions and not driving a vehicle in harsh conditions. In either case, the vehicle tends to spend a majority of its time parked and exposed to the elements. Although using a vehicle cover to protect a vehicle for long-term storage is only a minor inconvenience, installing and removing a vehicle cover on a daily basis, can become a significant nuisance. This is at least one reason why people who drive and park their vehicle outdoors on a daily basis do not use a vehicle cover. Even fairly sophisticated vehicle covers that roll up into the trunk rely on manual deployment and storage, which is still inconvenient enough to deter daily use. Furthermore, currently available vehicle covers must be dragged along the painted surfaces of the vehicle when being put in place. The creates an issue, as any dust or debris that is on the painted surface of the vehicle can cause scratches to the paint as the cover is pulled over the painted surface.

Therefore there is a need in the art for a system and method to automatically install and remove a vehicle cover. A vehicle cover that is convenient to use on a daily basis enables vehicles to be protected from the elements even when a vehicle is not in long-term storage. Additionally, a vehicle cover that is held above the surface of a vehicle will help reduce the occurrence of scratches that are caused by dust that is on the painted surface of the vehicle. These and other features and advantages of the present invention will be explained and will become obvious to one skilled in the art through the summary of the invention that follows.

SUMMARY OF THE INVENTION

The present invention generally relates to an automatic vehicle cover that can deploy a vehicle cover over the body of a vehicle with minimal or no effort from a user. Embodiments of the present invention may include a vehicle cover apparatus comprising of a vehicle cover connected to an interconnected framework that extends from a dock to position the vehicle cover over the vehicle.

According to an embodiment of the present invention, an automatic vehicle cover apparatus, the vehicle cover apparatus comprising a housing dock comprising a dock frame and a wire refraction means, an interconnected framework comprising a series of frame segments, wherein a first end of the interconnected framework is connected to the housing dock and the interconnected framework is biased to an extended configuration by one or more tension means, and one or more retraction wires connected between the wire retraction means on the housing dock and one or more retraction wire anchor points at a second end of the interconnected framework, wherein the retraction wire, the retraction wire anchor points, and the wire refraction means cooperate to extend and retract the interconnected framework.

According to an embodiment of the present invention, the automatic vehicle cover apparatus further comprises a flexible shell attached to the interconnected framework.

According to an embodiment of the present invention, the automatic vehicle cover apparatus further comprises one or more shell support rods that are attached to the interconnected framework and provide support for the flexible shell.

According to an embodiment of the present invention, the automatic vehicle cover apparatus further comprises one or more wheel assemblies attached to the interconnected framework that enable the interconnected framework to roll out over a vehicle, wherein one of the one or more wheel assemblies is attached to the second end of the interconnected framework.

According to an embodiment of the present invention, the automatic vehicle cover apparatus further comprises one or more slider assemblies attached to the interconnected framework that enable the interconnected framework to roll out over a vehicle, wherein one of the one or more slider assemblies is attached to the second end of the interconnected framework.

According to an embodiment of the present invention, the one or more tension means are connected to at least one of the frame segments.

According to an embodiment of the present invention, each frame segment comprises a pair of cross-members formed with a first pair of rotatable endpoints at a first end of the frame segment and a second pair of rotatable endpoints at a second end of the frame segment.

According to an embodiment of the present invention, a tension means is connected between the pair of rotatable endpoints on at least one of the ends of the frame segment.

According to an embodiment of the present invention, a tension means is positioned inside of at least one of the pairs of rotatable endpoints.

According to an embodiment of the present invention, the cross-members are connected via a rotatable midpoint connection.

According to an embodiment of the present invention, the rotatable midpoint connection allows the frame segment to move between a collapsed and extended position via a scissor-like motion.

According to an embodiment of the present invention, a tension means is positioned inside of the rotatable midpoint connection.

According to an embodiment of the present invention, the dock frame comprises a framework stowing portion and a handle portion.

According to an embodiment of the present invention, the wire retraction means comprises a wire spool and spool winding means.

According to an embodiment of the present invention, the spool winding means is a motor powered by a power source and controlled by a control unit.

According to an embodiment of the present invention, the automatic vehicle cover apparatus further comprises one or more environmental sensors connected to the vehicle cover apparatus that are selected from a group of environmental sensors consisting of temperature sensors, shock sensors, disturbance sensors, cameras, microphones, and battery power sensors.

According to an embodiment of the present invention, a vehicle cover apparatus, the vehicle cover apparatus comprising a dock frame comprising a framework stowing portion and a handle portion, and an interconnected framework comprising a series of frame segments, wherein each of the frame segments comprises a pair of cross-members that are connected by a rotatable midpoint connection and formed with a first pair of rotatable endpoints at a first end each of the frame segments and a second pair of rotatable endpoints at a second end of each the frame segments, wherein a first end of the interconnected framework is connected to the dock frame and a second end of the framework is connected to a wheel assembly.

According to an embodiment of the present invention, the automatic vehicle cover apparatus further comprises a flexible shell attached to the interconnected framework.

According to an embodiment of the present invention, the automatic vehicle cover apparatus further comprises one or more shell support rods that are attached to the interconnected framework and provide support for the flexible shell.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to automatically deployed and refracted car cover systems. Specifically an interconnected framework of arms and springs has a retraction wire wrapped around a spool with a motor attached. When the motor releases the retraction wire in a controlled manner, the springs cause the interconnected framework to extend over the top of a vehicle. A flexible shell is attached to the framework and covers the vehicle as the interconnected framework is extended. The cover is retracted by the motor winding the retraction wire back onto the spool pulling the interconnected framework back to a housing dock.

Figure 1A:
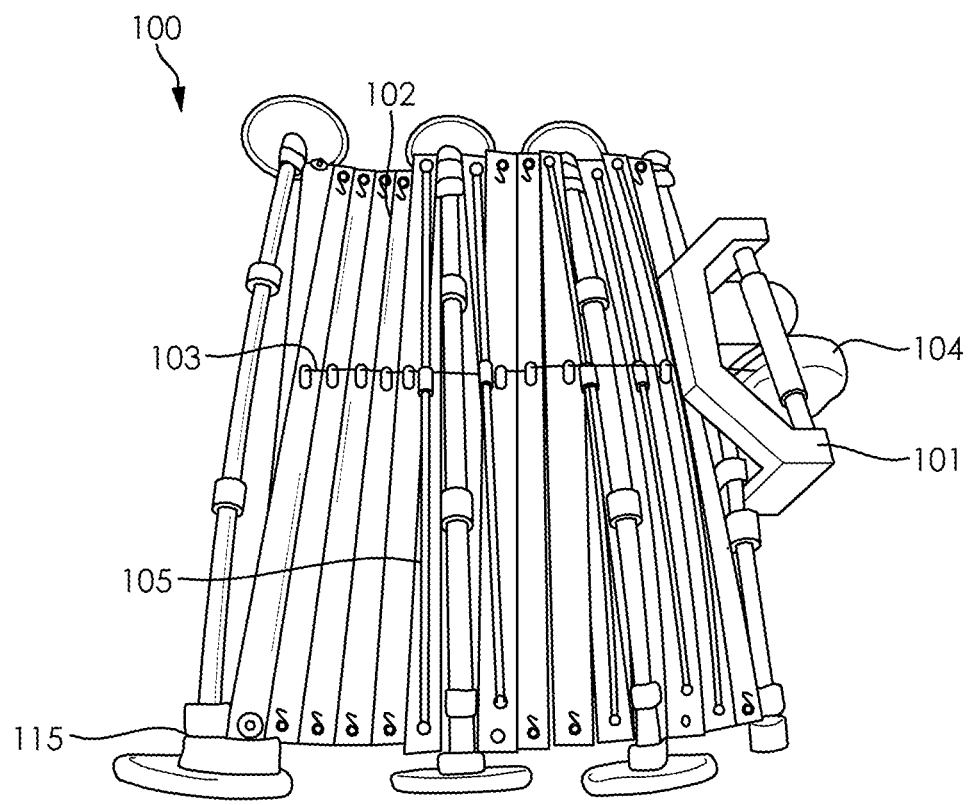
FIG. 1A is a top view of the vehicle cover system in the retracted state without the flexible shell attached according to an embodiment of the present invention, in accordance with an embodiment of the present invention.
Figure 1B:
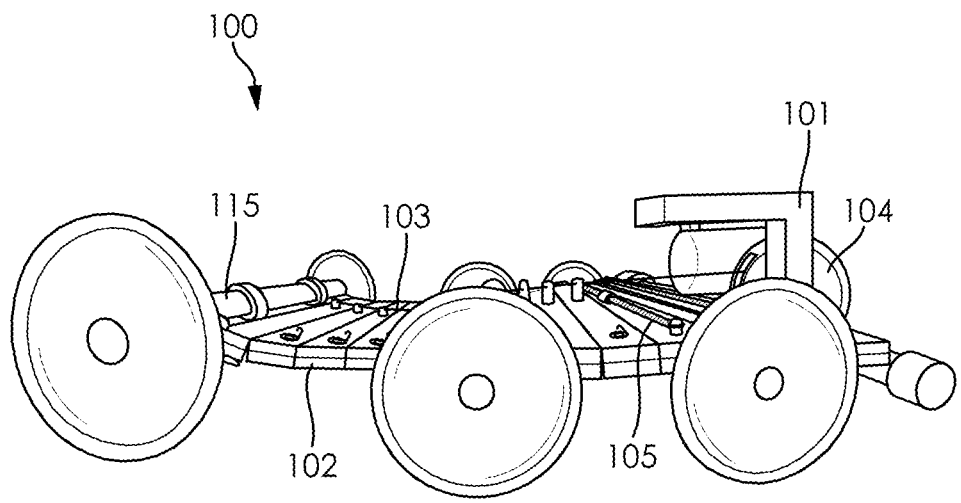
FIG. 1B is a side view of the vehicle cover system in the retracted state without the flexible shell attached according to an embodiment of the present invention, in accordance with an embodiment of the present invention.
Figure 2:
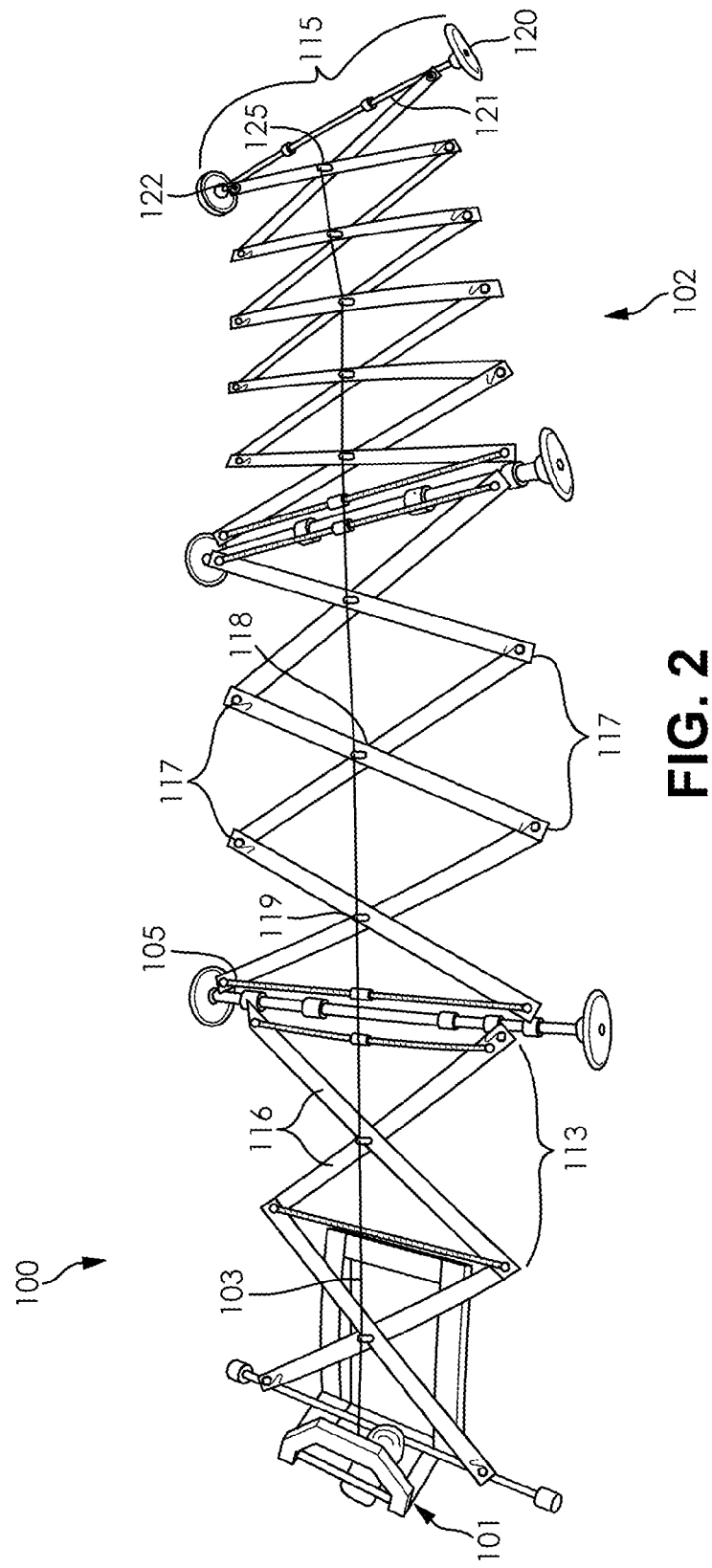
FIG. 2 is a top view of the vehicle cover system in the partially deployed state without the flexible shell attached according to an embodiment of the present invention, in accordance with an embodiment of the present invention.
Figure 11A:
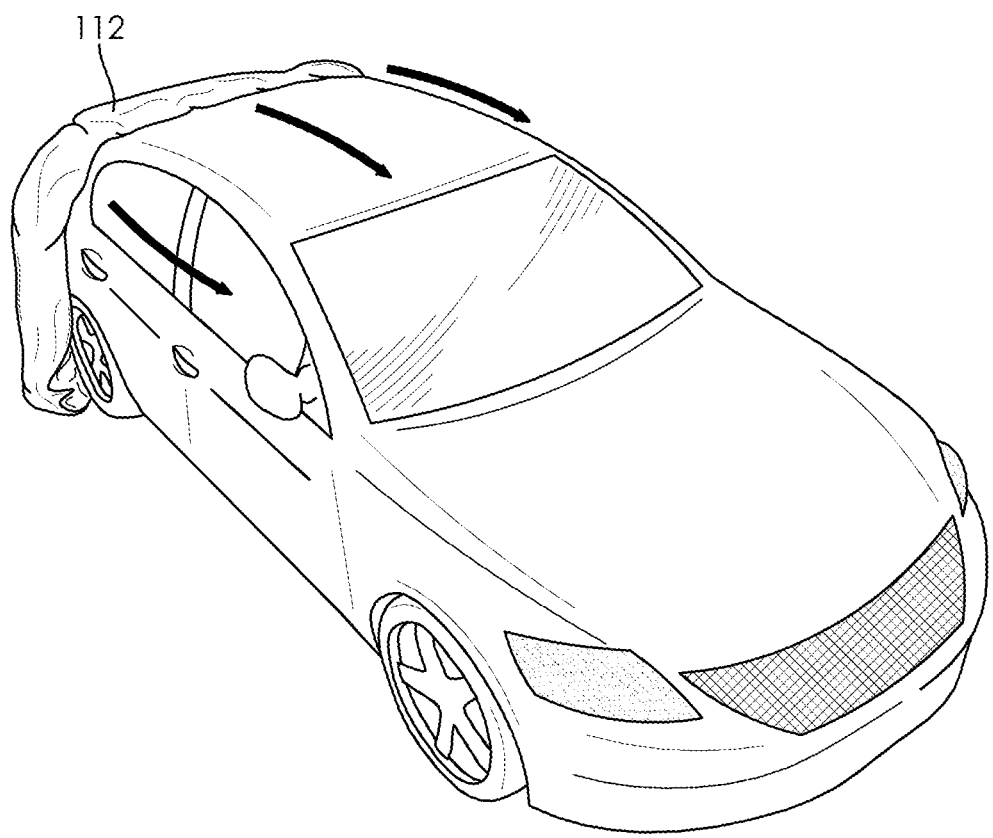
FIG. 11A is a view of the automatic cover system when placed on the trunk of a car in the undeployed state with the flexible cover attached, in accordance with an embodiment of the present invention.
Figure 11B:
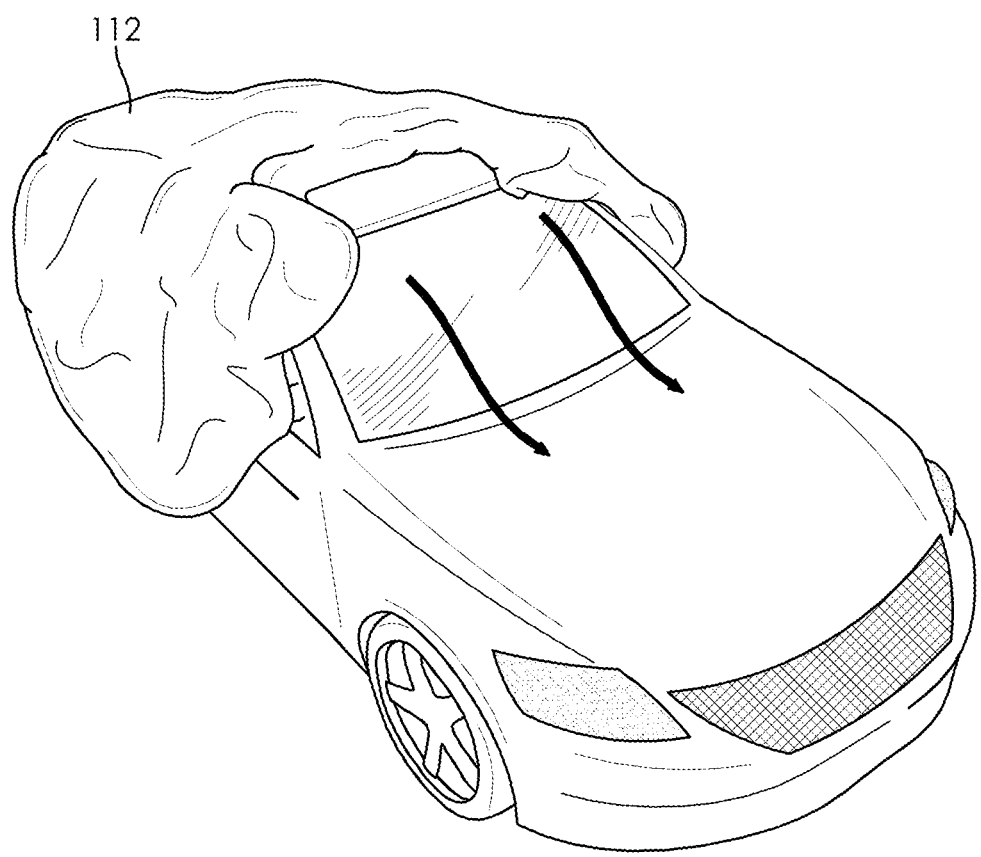
FIG. 11B is a view of the automatic cover system when placed on the trunk of a car in the partially deployed state with the flexible cover installed, in accordance with an embodiment of the present invention.

According to an embodiment of the present invention as shown in FIGS. 1A, 1B, and 2, the automatic vehicle cover comprises a housing dock 101, an interconnected framework 102, a retraction wire 103, and wire retraction means 104. In some embodiments, (as shown in FIGS. 11A and 11B) the automatic vehicle cover 100 may also include a flexible shell 112 that is attached to and covers the interconnected framework. The interconnected framework 102 is configured with a tension means 105 that biases the interconnected framework 102 to extend out from the housing dock 101 unless a compressive force is applied by the retraction wire 103 and wire retraction means 104. In some embodiments, this compression force is applied by the retraction wire 103 which is attached to the end of the interconnected framework 102 and wound around a spool 111 by a spool winding means 110 on the housing dock 101. When this retraction wire 103 is unwound, the interconnected framework 102 is allowed to extend out over the top of the vehicle, pulling the flexible shell with it. A spool winding means 110, such as a motor, in the housing dock 101 winds the retraction wire 103 back onto the spool 111 to retract the interconnected framework 102 back to the housing dock 101.

According to an embodiment of the present invention as shown in FIGS. 1A, 1B, and 2, the interconnected framework 102 is made up of several frame segments or X-segments 113 that are biased by a tension means 105, and the endpoints on one side of each X-segment 113 are attached to the endpoints on the other side of the adjoining X-segment 113 by a rotatable end connection 117. The cross-members 116 of the X-segment 113 are connected to each other by a rotatable mid-connection 118. Each X-segment 113 is capable of moving or rotating between a collapsed position, as shown in FIGS. 1A and 1B, where the cross-members 116 are substantially parallel, to an extended position, as shown in FIG. 2, and back to the collapsed position in a scissor-like motion. The tension means 105 of the X-segments 113 creates a bias to the extended configuration so that, unless a compressing force is applied to the interconnected framework 102 of X-segments 113 by the retraction wire 103, the frame segments 113 will naturally move into the extended position. In the preferred embodiment, because the interconnected framework comprises multiple frame segments 113, the overall length of the interconnected framework can be easily customized by adding or removing frame segments to achieve an automatic vehicle cover of a particular length.

According to an embodiment of the present invention, the X-segments 113 are biased by a tension means at the rotatable end connection 117 between two adjoining X-segments 113. In a preferred embodiment, the tension means 105 might be a torsion spring such as a flexible rod, helical torsion spring, or any other elastic object that stores mechanical energy when twisted or stretched. One or ordinary skill in the art would recognize that any mechanism for storing mechanical energy could be used as a tension means 105 in the junctions between each X-segment 113 in order to create a bias for the extended position without departing from the spirit and scope of the present invention.

According to another embodiment of the present invention, the tension means 105 creates a bias to the extended position through some other mechanism. For example the tension means 105 may be a long spring stretched between each side of an X-segment 113 perpendicular to the extending direction, so that the spring pulls the two ends together causing the X-segment 113 to move from the collapsed position to the extended position. A torsion spring may also be placed at the rotatable mid-connection 118 of the two cross-members 116 of an X-segment 113 to create a bias to the extended position. One of ordinary skill in the art would recognize that any of the above methods or still others could be used to create a bias in an X-segment 113 for the extended position without departing from the spirit and scope of the present invention.

According to an embodiment of the present invention as shown in FIGS. 1A, 1B, and 2, one or more sets of wheels 120 are attached to the interconnected framework 102. The wheels 120, which may also be referred to as wheel assemblies, are placed strategically along the length of the interconnected framework 102 to allow the interconnected framework 102 to traverse the top of a vehicle where there may be bumps, gaps, windshield wipers, antennas, or other obstacles. The wheels 120 also help to raise the interconnected framework 102 off the top of the vehicle to prevent contact with the surface and reduce the risk of scratching or other damage to the vehicle. The wheels 120 may be attached under the interconnected framework 102, or attached to the ends of the cross-members 116 of one or more X-segments 113. In some embodiments, the wheel assemblies may be further comprises one or more wheel axles 121 to which the wheels 120 are attached. The wheel axles 121 are typically attached to the interconnected framework 102. One of ordinary skill in the art would recognize that any method of attaching wheels 120 to the interconnected framework 102 could be used without departing from the spirit and scope of the present invention.

According to one embodiment of the present invention, the wheel assemblies, including the wheels 120 and the wheel axles 121, are connected to the ends of the X-segments 113 such that the connection points 122 can slide along the wheel axle. Where two X-segments 113 are connected to the same wheel axle 121, the X-segments 113 need not be directly connected to each other, but may slide independently of each other along the wheel axle 121. As the X-segment 113 attached to a wheel axle 121 rotates from the collapsed position to the extended position, the distance between the connection points 122 of the cross-members 116 attached to the wheel axle 121 narrows and the connection points 122 slide closer together along the wheel axle.

According to an embodiment of the present invention, as an alternative to the one or more wheel assemblies described above, the interconnected framework may, in the alternative, be configured with one or more slider assemblies. In a preferred embodiment, the slider assemblies would serve the same purpose as the wheel assemblies and the other components related thereto, except that instead of wheels, the slider assemblies would be skid or ski-like slider that is configured to slide over the surface of the car, instead of rolling over the surface of the car like the wheel. In the preferred embodiment, the sliders would be made of any material that is soft and smooth enough to not damage the paint of a vehicle, but still being of low enough friction to glide over the paint. This may be achieved by using an appropriate plastic material to create the sliders or by covering the sliders in felt or microfiber. Other than the change from a wheel to a slider, the slider assembly would function in the same manner as the wheel assembly, including the use of axles and connection points that slide along the axles. One of ordinary skill in the art would appreciate that slider and wheel assemblies may be used in combination with each other and the use of one does not exclude the use of the other.

Figure 3:
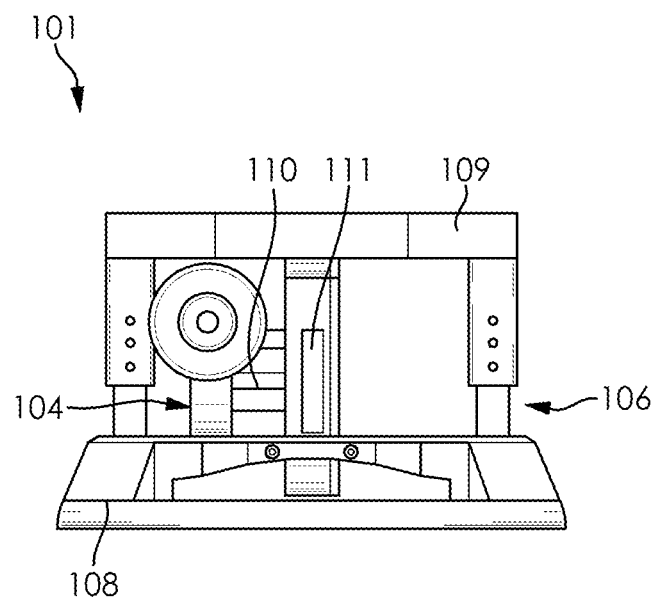
FIG. 3 is a front view of the housing dock showing the dock frame and the wire retraction means, in accordance with an embodiment of the present invention.

According to an embodiment of the present invention as shown in FIGS. 1A, 1B, and 2, the interconnected framework 102 has a retraction wire 103 running along its length. This retraction wire 103 is attached to the end of the interconnected framework 102 at a retraction wire anchor point 125 and winds up on a spool 111 (as shown in FIG. 3), applying a pulling force to the interconnected framework 102 and collapsing it back into the housing dock 101. In one embodiment, this refraction wire 103 runs down the central axis of the interconnected framework 102, passing over the junction of the two cross-members 116 of each X-segment 113. In an alternate embodiment of the present invention, the retraction wire 103 runs along one edge of the interconnected framework 102. In yet another alternate embodiment, two retraction wires 103 are used, with one running along each side of the interconnected framework 102. In still another embodiment of the present invention, the retraction wire 103 is affixed to a point on the housing dock 101 and runs out to the end of the interconnected framework 102 and doubles back to the spool 111. This particular configuration cuts the torque required at the spool in half while doubling the amount of wire that needs to be wound up. One of ordinary skill in the art would recognize that any configuration of one or more retraction wire 103 could be used to apply a pulling force and collapse the interconnected framework 102 without departing from the spirit and scope of the present invention.

According to one embodiment of the present invention as shown in FIG. 2, the retraction wire 103 runs through wire guides 119 attached at various points along the length of the interconnected framework 102. The purpose of the wire guides 119 is to prevent the retraction wire 103 from getting bound up in the moving parts of interconnected framework 102 and keeping the interconnected framework 102 and retraction wire 103 running along substantially the same axis. In a preferred embodiment, these wire guides 119 are placed along a single axis running the length of the interconnected framework 102, but they may also be placed so that the retraction wire 103 runs in a crisscross, shoe-lacing, or other ordered pattern. According to an embodiment of the present invention, the wire guides 119 have pulleys incorporated into them to reduce friction as the retraction wire 103 is pulled through them.

According to an embodiment of the present invention, one or more of the wire guides 119 may be attached to springs running perpendicular to the refraction wire 103 in a way that allows the wire guides 119 to slide along the spring. In a preferred embodiment, the wire guide 119 could comprise two perpendicular cylinders or rings, where one cylinder is configured to go around the spring and the other is configured to allow the retraction wire 103 to move freely through the center of that cylinder. Therefore, the wire guide 119 would not have to be a static point as it would be able to slide back and forth along the spring while still controlling the retraction wire 103. One of ordinary skill in the art would recognize that the wire guides 119 could also be attached in this same manner to cross-rods, wheel axles, or any part of the interconnected framework 102 without departing from the spirit and scope of the present invention.

Figure 4:
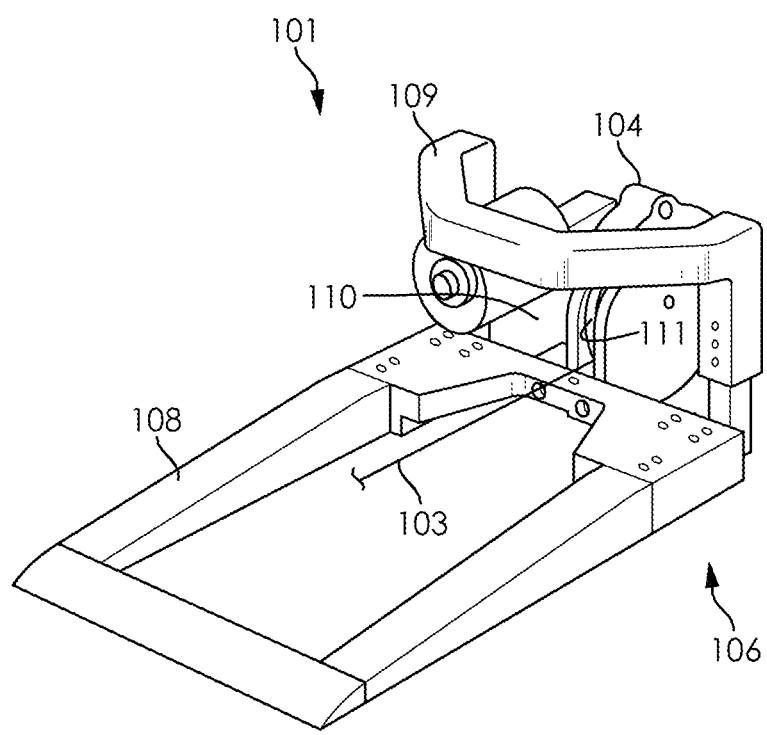
FIG. 4 is a perspective view of the housing dock showing the dock frame and the wire retraction means, in accordance with an embodiment of the present invention.

According to an embodiment of the present invention as shown in FIGS. 3 and 4, the housing dock 101 comprises a dock frame 106 and a wire retraction means 104. In a preferred embodiment, the dock frame 106 comprises a framework stowing portion 108 and a handle portion 109, while the wire retraction means 104 comprises a spool winding means 110 and a wire spool 111. In the preferred embodiment, the framework stowing portion 108 has two extension arms connected by a cross-beam, while the handle portion 109 extends in a substantially perpendicular manner from the framework stowing portion 108. The framework stowing portion 108, largely functions as a resting place that collects the interconnected framework 102 when the interconnected framework 102 is in the collapsed position. In the preferred embodiment, the spool winding means 110 is a motor that winds the wire spool 111 to draw the retraction wire 103 in and out. In some embodiments, the spool winding means 110 could be a manually operated winder. In some embodiments, the wire retraction means 104 may further comprise a control unit that is used to regulate the wire retraction means 104.

According to an embodiment of the present invention as shown if FIGS. 11A and 11B, the automatic vehicle cover of the present invention further comprises a flexible shell 112. In a preferred embodiment, the primary function of the flexible shell 112 is to provide protection to the vehicle against environmental elements, including, but not limited to, sun, precipitation, dirt, and other debris. In the preferred embodiment, the interconnected framework (not visible) largely holds the flexible shell 112 above the painted surface of the vehicle to minimize scratches that might be caused by moving the flexible shell 112 across the vehicle while the vehicle cover is being set into place. The possibility of scratches is further reduced because the preferred embodiment of interconnected framework (not visible) is made from plastic material that is softer than both the clear coat and the paint of the vehicle. Furthermore, the interconnected framework (not visible) itself is largely held above the painted surface of the vehicle by wheel and or slider assemblies. In some embodiments, the flexible shell 112 might be further configured with a series of air cells that could be inflated to provide an air cushion that protects the vehicle from impact damage.

Figure 5:
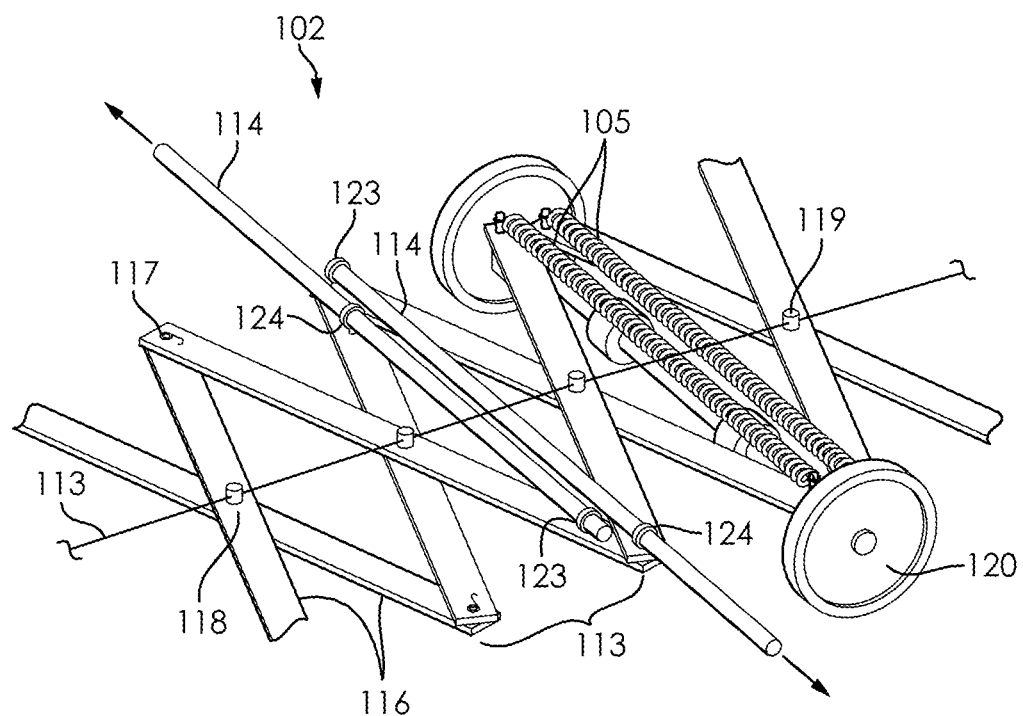
FIG. 5 is detailed view showing the interconnected framework with wheeled cross-rods, X-segments, tension means, retraction wire, shell support rods, the other components that are attached to the interconnected framework, in accordance with an embodiment of the present invention.
Figure 6:
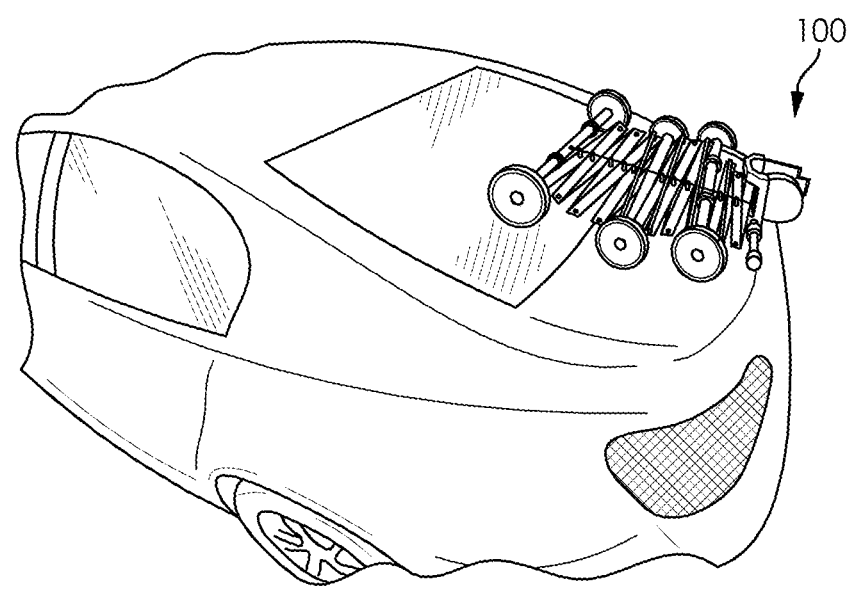
FIG. 6 is a view of the automatic cover system when placed on the trunk of a car in the undeployed state without the flexible cover, in accordance with an embodiment of the present invention.
Figure 7:
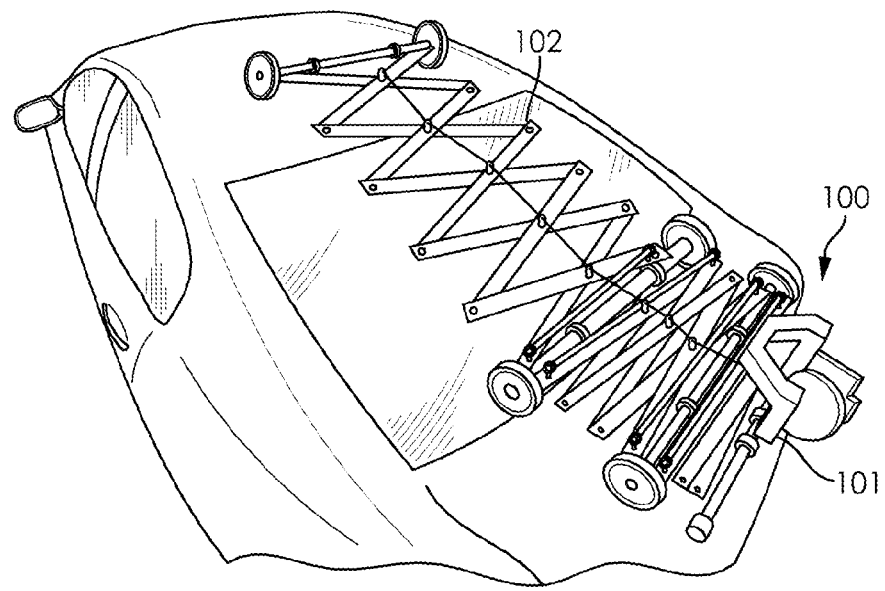
FIG. 7 is a view of the automatic cover system placed on a car in the partially deployed state without the flexible cover, in accordance with an embodiment of the present invention.
Figure 8:
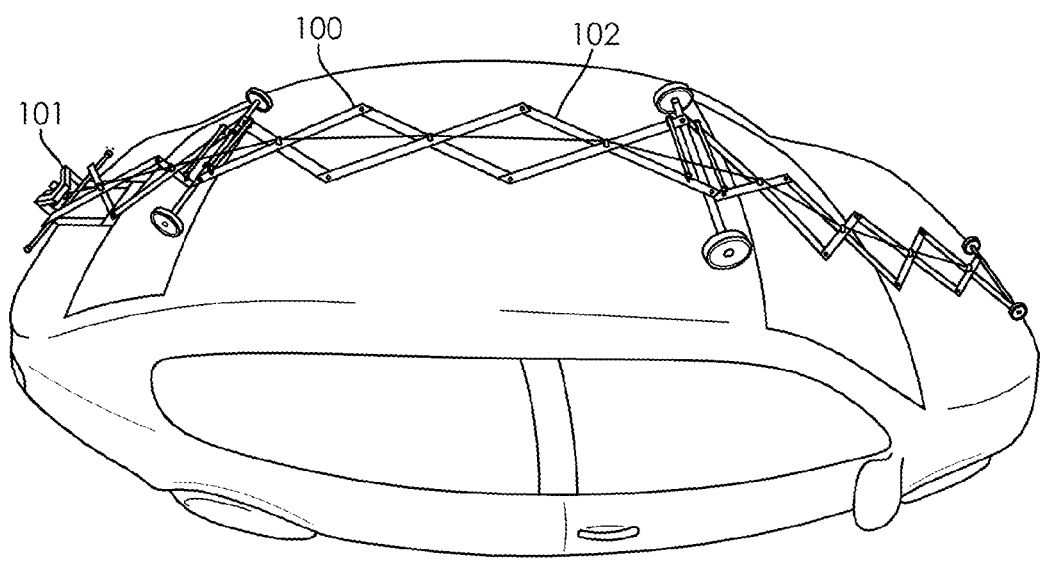
FIG. 8 is a top view of a car with the automatic cover system in place in a deployed state without the flexible cover, in accordance with an embodiment of the present invention.
Figure 9:
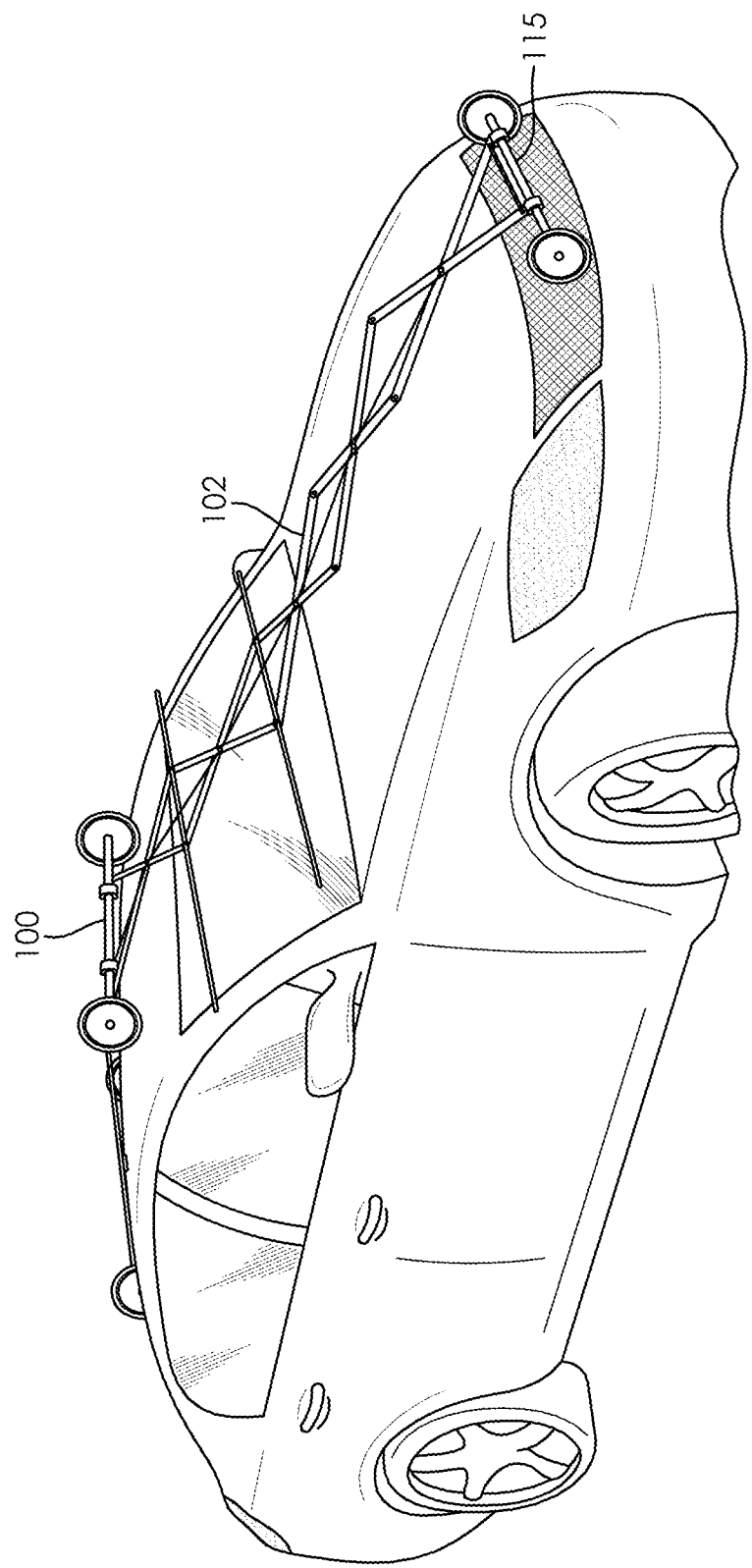
FIG. 9 is a view of a car with the automatic cover system in place in a deployed state without the flexible cover, in accordance with an embodiment of the present invention.
Figure 10:
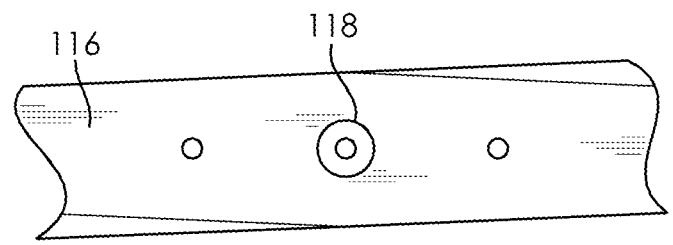
FIG. 10 is a detailed view of the connection between two X-segments with the spring incorporated into the junction rather than stretched across between two joints, in accordance with an embodiment of the present invention.

According to an embodiment of the present invention as shown in FIG. 5, the interconnected framework may further comprise one or more shell support rods 114. In a preferred embodiment, the one or more shell support rods 114 are positioned strategically along the length of the interconnected framework. In the preferred embodiment, the shell support rods 114 are configured to provide additional structural support to the flexible shell (not shown) extending beyond the width of the interconnected framework 102. In the preferred embodiment, the shell support rods 114 are useful because, as the interconnected framework 102 expands to its extended configuration, the width of the interconnected framework 102 narrows. As illustrated in FIG. 5, to ensure that the support rods 114 are able to properly support the flexible shell as the interconnected framework 102 moves between its extended and collapsed configurations, each of the support rods 114 is connected with a rigid connection 123 on one side of the interconnected framework 102 and with a sliding connection 124 on the other side of the interconnected framework 102.

According to a preferred embodiment of the present invention as shown in FIG. 5, the one or more support rods 114 will typically be found in cooperating pairs, where each of the shell support rods 114 in the pair is configured to slide in the opposite direction of the other. In a preferred embodiment, this may be achieved by having the first shell support rod 114 of the pair rigidly connected 123 to a first side of the interconnected framework 102 and having a sliding connection 124 on the second side of the interconnected framework, while the second shell support rod 114 of the pair is rigidly connected 124 to the second side of the interconnected framework and having the sliding connection 123 on the first side of the interconnected framework. The rigid connection 123 will firmly hold a shell support rod 114 in place on one side of the interconnected framework. As the interconnected framework expands or collapses the shell support rod 114 will be moved through a sliding connection point 124 at the opposite side of the interconnected framework 102, thereby allowing the shell support rod 114 to move independently of the interconnected framework 102 so as to allow each shell support rod 114 to maintain substantially the same width no matter the configuration of the interconnected framework. In the preferred embodiment, the rigidly fixed connection point 123 is any suitable connection point that permanently holds one end of the shell support rod in place, while the sliding connection point 124 is a ring or other open connection point that allows the other end of the shell support rod to slide back and forth as the interconnected framework 102 expands and collapses.

According to an embodiment of the present invention, the automatic vehicle cover has non-abrasive coverings, such as pads, boots, coverings, or patches attached at any point that contacts or could contact the vehicle surface. These non-abrasive coverings protect the vehicle from being scratched or otherwise damaged by any parts of the automatic vehicle cover as it extends over the top of the vehicle.

According to an embodiment of the present invention, the automatic vehicle cover is stored inside the trunk of a car. When the car is parked, the user removes the automatic vehicle cover from the trunk and places it on top of the trunk of the car in order to deploy the cover, as shown in FIG. 11A. In the preferred embodiment, the automatic vehicle cover is secured to the trunk of the vehicle of a vehicle cover securing means. The vehicle cover securing means may be suction cup, rubberized feet, a magnet, or any combination of thereof. When the automatic vehicle cover receives a signal from the user, either from a manual local input such as a switch or button, or from a remote signal, the spool winding means begins to unwind the retraction wire from the wire spool. As the retraction wire is unwound, the tension means at the joints between each X-segment will compress causing the X-segments to extend in a scissor motion, as shown in FIGS. 6-9. The extension of the interconnected frame will cause the flexible shell 112 that is attached to the interconnected frame to be pulled along and cover the car as shown if FIGS. 11A and 11B.

According to an embodiment of the present invention as shown by FIGS. 6-9, the wheels on the interconnected framework 102 roll over joints, windshield wipers, antennas, and keep the interconnected framework 102 raised off the surface of the car to prevent scratching or other possible damage. As the retraction wire unspools, the interconnected framework 102 glides or crawls over the car following the contour along the top of the vehicle and because the flexible shell 112 (as shown in FIGS. 11A and 11B) is attached to the interconnected framework 102 at various points, the flexible shell 112 is pulled over the top of the car. When the end of the interconnected framework 102 reaches the front of the car, the motor stops unspooling the retraction wire, and the interconnected framework 102 stops extending.

According to an embodiment of the present invention, the spool winding means 110 (e.g. motor) of the wire retraction means 104 is controlled by a control unit. In a preferred embodiment, the control unit controls the motor to start and stop the wire spool 111 to wind or unwind the retraction wire 103. The speed at which the refraction wire 103 winds and unwinds is a function of both the speed of the spool winding means 110, which is regulated by the control unit, and the diameter of the wire spool 111.

According to an embodiment of the present invention, the control unit regulates the winding and unwinding of the retraction wire 103. In a preferred embodiment, the control unit is primarily comprises a central processing unit (CPU) that receives data from one or more attached sensors in order to control the spool winding means 110, which in the preferred embodiment is an electric motor. In the preferred embodiment, a retraction wire sensor is primarily responsible for providing information to the CPU about the retraction wire 103. The retraction wire sensor may be configured to start and stop the electric motor to ensure that, first, the interconnected framework 102 does not extend too quickly thereby causing the retraction wire to become tangled and, second, to disengage the electric motor when the interconnected framework 102 was been fully retracted so that the retraction wire 103 does not break. In some embodiments, the electric motor may be started by a switch or user interface located on the automatic vehicle cover, while in other embodiments, the electric motor may be engaged remotely by an R/F controller, a Bluetooth® connection, Wi-Fi connection, or any other suitable wireless signal.

According to an embodiment of the present invention, the automatic vehicle cover may further comprise of a variety of sensors that are connected to the control unit. The optional sensors may include, but are not limited to, temperature sensors, shock sensors, disturbances monitors, cameras, microphones, battery power sensors. Data from these various sensors may be relayed by wires sewn into flexible shell or incorporated into the frame. The data from the sensors may also be transmitted wirelessly through various methods discussed above. These sensors may be used to give the automatic vehicle cover any number of additional functions. For example, upon a sensor detecting a disturbance, air cells sewn into the flexible shell could be filled with air to provide a protective air cushion around the vehicle. As another example, a temperature sensor may be useful where the control unit is integrated with the climate and ventilation controls of the vehicle to allow automatic control of the climate and ventilation systems when a threshold temperature is measured (e.g. open the windows when a maximum temperate is measured). Likewise, a camera and microphone could be used to monitor the vehicle remotely. In particular, the camera and microphone could interface with control unit to transmit sound and video images to a user that is at a remote location via a wireless internet connection or cellular data connection.

Retracting the automatic vehicle cover works like deployment in reverse. When a signal or command is received from the user, the motor turns the spool and begins to wind up the retraction wire 103. As the retraction wire 103 is wound up, it overcomes the tension in the tension means 105 and folds the interconnected framework 102 back up through a scissor motion at each X-segment 113. When the interconnected framework 102 is completely collapsed back into the framework stowing portion 108 of dock frame 106, as shown in FIG. 2, the motor will stop spooling the retraction wire 103. The automatic vehicle cover device can then be stored in the vehicle.

According to an embodiment of the present invention, the automatic vehicle cover includes a power source. In a first preferred embodiment, the power source is a battery on the housing dock 101. In a second preferred embodiment, the power source is the power system of the vehicle the automatic vehicle cover is being used on. One of ordinary skill in the art would appreciate that both of these power systems could be use together and that the use of one would not preclude the use of the other.

According to an embodiment of the present invention, the automatic vehicle cover may be a manually deployable vehicle cover. In a preferred embodiment of a manually deployable vehicle cover, the vehicle cover is configured without any tension means or wire retraction means. In the preferred embodiment, the manually deployable vehicle cover is essentially the interconnected framework with the flexible shell attached. In such an embodiment, a user would secure one end of the cover apparatus to the front or back of the vehicle and pull the other end of the cover apparatus to the opposite end of the vehicle. The interconnected framework allows the flexible shell to be positioned on the vehicle more efficiently than a traditional cover, because the interconnected framework would support the flexible shell allowing the flexible shell to be pulled into position with a single motion, rather than with a traditional cover where a user would have to walk around to each side of the vehicle to get the cover in place.

While the invention has been thus described with reference to the embodiments, it will be readily understood by those skilled in the art that equivalents may be substituted for the various elements and modifications made without departing from the spirit and scope of the invention. It is to be understood that all technical and scientific terms used in the present invention have the same meaning as commonly understood by one of ordinary skill in the art to which this invention belongs. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

The invention claimed is:

1. An automatic vehicle cover apparatus, said vehicle cover apparatus comprising:
   a housing dock comprising a dock frame and a wire retraction means;
   an interconnected framework comprising a series of frame segments, wherein a first end of said interconnected framework is connected to said housing dock and said interconnected framework is biased to an extended configuration by one or more tension means;
   one or more retraction wires connected between said wire retraction means on said housing dock and one or more retraction wire anchor points at a second end of said interconnected framework, wherein said retraction wire, said retraction wire anchor points, and said wire retraction means cooperate to extend and retract said interconnected framework;
   a flexible shell attached to said interconnected framework; and
   one or more shell support rods that are attached to said interconnected framework and provide support for said flexible shell.

2. The automatic vehicle cover apparatus of claim 1, further comprising one or more wheel assemblies attached to said interconnected framework that enable said interconnected framework to roll out over a vehicle, wherein one of said one or more wheel assemblies is attached to said second end of said interconnected framework.

3. The automatic vehicle cover apparatus of claim 1, further comprising one or more slider assemblies attached to said interconnected framework that enable said interconnected framework to roll out over a vehicle, wherein one of said one or more slider assemblies is attached to said second end of said interconnected framework.

4. An automatic vehicle cover apparatus, said vehicle cover apparatus comprising:
   a housing dock comprising a dock frame and a wire retraction means;
   an interconnected framework comprising a series of frame segments, wherein a first end of said interconnected framework is connected to said housing dock and said interconnected framework is biased to an extended configuration by one or more tension means, and, wherein said one or more tension means are connected to at least one of said frame segments; and
   one or more retraction wires connected between said wire retraction means on said housing dock and one ore more retraction wire anchor points at a second end of said interconnected framework, wherein said retraction wire, said retraction wire anchor points, and said wire retraction means cooperate to extend and retract said interconnected framework.

5. The automatic vehicle cover apparatus of claim 4, wherein each frame segment comprises a pair of cross-members formed with a first pair of rotatable endpoints at a first end of said frame segment and a second pair of rotatable endpoints at a second end of said frame segment.

6. The automatic vehicle cover apparatus of claim 5, wherein a tension means is connected between said pair of rotatable endpoints on at least one of said ends of said frame segment.

7. The automatic vehicle cover apparatus of claim 5, wherein a tension means is positioned inside of at least one of said pairs of rotatable endpoints.

8. The automatic vehicle cover apparatus of claim 5, wherein said cross-members are connected via a rotatable midpoint connection.

9. The automatic vehicle cover apparatus of claim 8, wherein said rotatable midpoint connection allows said frame segment to move between a collapsed and extended position via a scissor-like motion.

10. The automatic vehicle cover apparatus of claim 8, wherein a tension means is positioned inside of said rotatable midpoint connection.

11. The automatic vehicle cover apparatus of claim 4, wherein said dock frame comprises a framework stowing portion and a handle portion.

12. The automatic vehicle cover apparatus of claim 4, wherein said wire retraction means comprises a wire spool and spool winding means.

13. The automatic vehicle cover apparatus of claim 12, wherein said spool winding means is a motor powered by a power source and controlled by a control unit.

14. The automatic vehicle cover apparatus of claim 4, further comprising one or more environmental sensors connected to said vehicle cover apparatus that are selected from a group of environmental sensors consisting of temperature sensors, shock sensors, disturbance sensors, cameras, microphones, and battery power sensors.

15. A vehicle cover apparatus, said vehicle cover apparatus comprising:
    a dock frame comprising a framework stowing portion and a handle portion; and
    an interconnected framework comprising a series of frame segments, wherein each of said frame segments comprises a pair of cross-members that are connected by a rotatable midpoint connection and formed with a first pair of rotatable endpoints at a first end each of said frame segments and a second pair of rotatable endpoints at a second end of each said frame segments,
    wherein a first end of said interconnected framework is connected to said dock frame and a second end of said framework is connected to a wheel assembly.

16. The vehicle cover apparatus of claim 15, further comprising a flexible shell attached to said interconnected framework.

17. The vehicle cover apparatus of claim 15, further comprising one or more shell support rods that are attached to said interconnected framework and provide support for said flexible shell.

* * * * *